United States Patent [19]
Shimada et al.

[11] 4,106,866
[45] Aug. 15, 1978

[54] IMAGE PROJECTION SYSTEM
[75] Inventors: Satoshi Shimada, Yokohama; Norio Itoh, Tokyo, both of Japan
[73] Assignee: Sony Corporation, Tokyo, Japan
[21] Appl. No.: 597,088
[22] Filed: Jul. 18, 1975
[30] Foreign Application Priority Data
Jul. 25, 1974 [JP] Japan .................................. 49-88620
[51] Int. Cl.² .......................................... G03B 21/26
[52] U.S. Cl. ...................................... 353/29; 353/122
[58] Field of Search ....................... 353/29, 84, 65–67, 353/122, 30, 31, 94; 178/7.85, 7.86, 7.87; 240/3.1; 40/130 N, 132 C

[56] References Cited
U.S. PATENT DOCUMENTS

| 1,334,853 | 3/1920 | Griffith | 353/29 |
| 2,191,515 | 2/1940 | VonBronk | 353/29 |
| 3,820,885 | 6/1974 | Miller | 353/98 |
| 3,844,650 | 10/1974 | Nicholson | 353/122 |

Primary Examiner—Harry N. Haroian
Attorney, Agent, or Firm—Lewis H. Eslinger; Alvin Sinderbrand

[57] ABSTRACT

An apparatus having a projection lens through which an image produced by a Braun or cathode ray tube or other image reproducing device is projected onto a viewing screen is further provided with a source or sources of colored light, preferably of at least one hue different from that of the projected image, and which is superimposed on the image projected onto the viewing screen. The source or sources of colored light may directly irradiate the entire area of the viewing screen with such colored light, or the panel of the image reproducing device on which the image is produced may be irradiated with the colored light.

4 Claims, 5 Drawing Figures

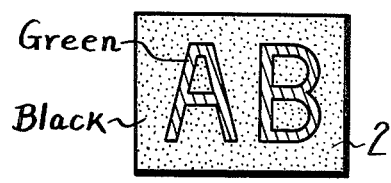
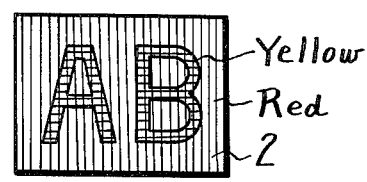
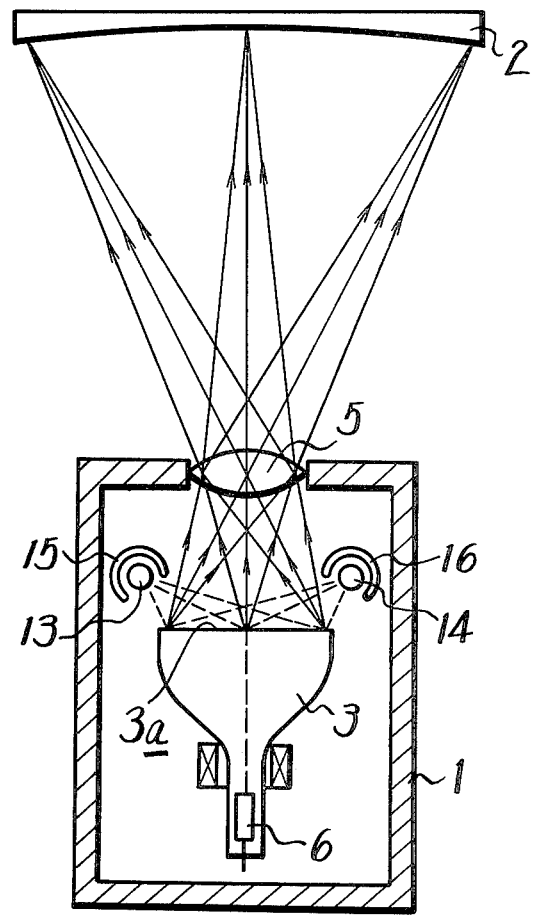

IMAGE PROJECTION SYSTEM

BACKGROUND OF THE INVENTION

1. Field of the Invention

This invention relates generally to the projection of images on a viewing screen, and more particularly is directed to improvements in image projection apparatus of the type in which images, for example, in the form of letters, indicia and/or patterns, produced by an image reproducing device, such as, a Braun or cathode ray tube, are projected through a projection lens onto a viewing screen for providing an enlargement of the reproduced image on the screen.

2. Description of the Prior Art

It has been proposed to provide an apparatus in which an image produced by a Braun or cathode ray tube or other image reproducing device is projected through a lens onto a viewing screen so as to provide an enlarged reproduced image on such screen. However, with such previously proposed apparatus, there is inadequate contrast between the projected image and the background or field of the viewing screen so that it is difficult to distinguish the projected image from the background or field, particularly when ambient illumination falls on the viewing screen. Further, if the reproduced images are to be of various colors so that the image reproducing device is in the form of a color cathode ray tube having a color phosphor screen and an associated shadow mask, such shadow mask inherently reduces the brightness of the reproduced image, and hence of the image projected on the viewing screen, so that the problem of distinguishing the projected image from the background or field of the viewing screen is aggravated.

OBJECTS AND SUMMARY OF THE INVENTION

Accordingly, it is an object of this invention to provide an apparatus for projecting onto a viewing screen an image produced by a Braun tube or other image reproducing device, and which is free of the above mentioned difficulties encountered in the prior art.

More particularly, it is an object of this invention to provide an image projecting apparatus, a aforesaid, in which the enlarged image projected on the screen is clearly distinguishable from the background or field of the viewing screen.

Another object is to provide an image projecting apparatus, as aforesaid, in which the enlarged image projected on the viewing screen is of increased brilliance.

A further object is to provide an image projecting apparatus, as aforesaid, in which the visibility of the projected image on the viewing screen, that is, the ability to distinguish between the projected image and the background or field of the viewing screen, is relatively less affected by ambient illumination.

In accordance with an aspect of this invention, an apparatus for projecting images on a viewing screen comprises image reproducing means, projection lens means for projecting onto the viewing screen images produced by the image reproducing means, and colored light source means for superimposing colored light therefrom on the images projected on the viewing screen, with such superimposed colored light being preferably of a hue or hues different from that of the projected image.

The above, and other objects, features and advantages of the invention, will be apparent in the following detailed description of illustrative embodiments which is to be read in connection with the accompanying drawings.

BRIEF DESCRIPTION OF THE DRAWINGS

FIGS. 3 and 4 are diagrammatic front elevational views of the viewing screen of the image projection system shown on FIG. 1, with the cross-hatching on such views representing respective colors or hues; and FIG. 5 is a schematic top plan view, partly in section, of an image projection system according to another embodiment of the invention.

DESCRIPTION OF THE PREFERRED EMBODIMENTS

Figure 1:
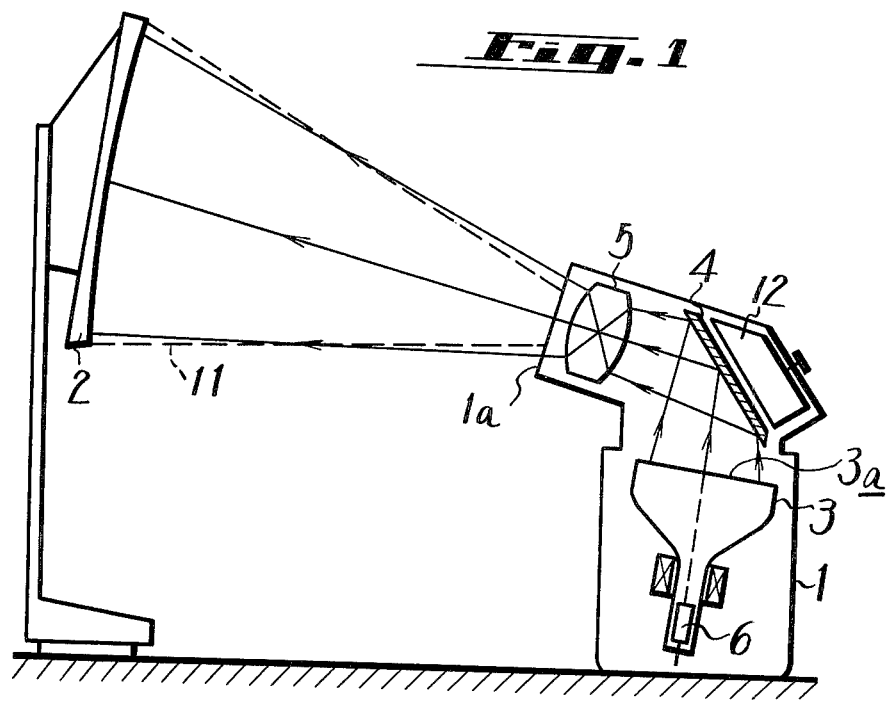
FIG. 1 is a schematic side elevational view, partly in section, of an image projection system according to an embodiment of this invention.
Figure 2:
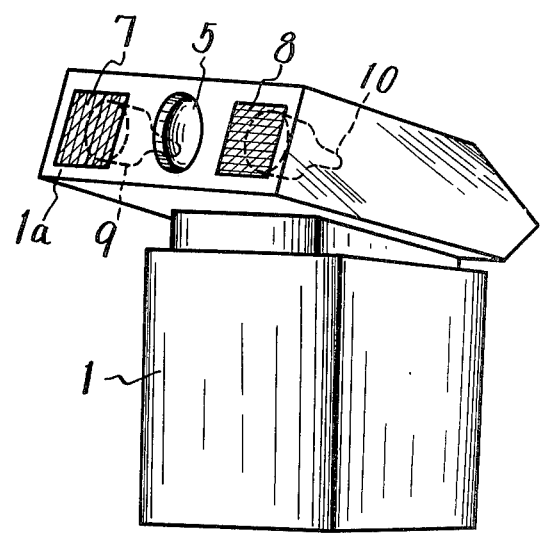
FIG. 2 is a perspective view of the image projecting apparatus included in the system shown on FIG. 1, with the cross-hatching on such view representing the colors or hues of light transmitted or passed by respective filters.

Referring to the drawings in detail, and initially to FIGS. 1 and 2 thereof, it will be seen that an apparatus according to this invention for projecting an image on a viewing screen 2 may comprise a cabinet 1 which is spaced substantially from the viewing screen and which contains an image reproducing device 3. As shown, such image reproducing device 3 may conveniently be in the form of a Braun or cathode ray tube having a phosphor screen or panel 3a on which the desired image is produced. The Braun or cathode ray tube 3 may be mounted substantially vertically within cabinet 1, as shown on FIG. 1, so that the image reproduced on the upwardly facing phosphor screen or panel 3a is then reflected forwardly by a mirror 4 through a projection lens 5 which is effective to project an enlargement of the image on the remote viewing screen 2.

In accordance with this invention, the image projecting apparatus further comprises light source means for superimposing colored light therefrom on the enlarged image or images projected on viewing screen 2, with the hue or hues of such colored light being preferably different from that of the image reproduced on the phosphor screen or panel 3a of the image reproducing device. By way of example, in the embodiment of the invention shown on FIGS. 1 and 2, the image reproducing device 3 may be a single color cathode ray tube having an electron gun 6 emitting a single electron beam directed against the phosphor screen 3a which is coated with a phosphor emitting green light when energized or excited by the electron beam so that a green image will be reproduced. In such case, the colored light source means provided in accordance with this invention may comprise color filters 7 and 8 disposed in a front panel 1a of cabinet 1 at the opposite sides of an opening in such front panel through which the image is projected by lens 5, and which are effective to pass red color light and blue color light, respectively, when lamps 9 and 10 disposed in back of filters 7 and 8, respectively, are energized or illuminated (FIG. 2). It will be apparent that, when lamp 9 is energized or illuminated, the red light passing through filter 7 directly irradiates the entire area of viewing screen 2, as indicated by the broken lines 11 on FIG. 1, so that such red light will be superimposed on the reproduced green image which is projected, by means of the mirror 4 and projection lens 5, from phosphor screen 3a onto viewing screen 2. Similarly, when the other lamp 10 is energized or illuminated, the entire area of viewing screen 2 is irradiated with the blue light passing through filter 8 and which is superimposed on the projected green image. Further, as shown on FIG. 1, if desired, a suitable mechanism, indicated schematically at 12, may be provided for adjustably supporting mirror 4 so that the angle of the latter can be varied.

It will be apparent that, when both lamps 9 and 10 are deenergized, only the light of the image produced on the phosphor screen 3a of tube 3 is projected onto viewing screen 2. In the case where the phosphor screen 3a emits green light and the image produced thereon is, for example, in the form of the letters "A" and "B", the enlarged image of the letters "A" and "B" projected on the viewing screen 2 is green, while the background or field of the screen is black, as shown on FIG. 3. However, when, for example, the lamp 9 is illuminated, the red light passing through the respective filter 7 irradiates the entire area of the viewing screen and is superimposed on the enlarged projected image. As a result, the background or field of the screen is red while the enlarged projected image of the letters "A" and "B" appears to be yellow, as shown on FIG. 4. On the other hand, when the lamp 10 is illuminated, the blue light passing through the respective filter 8 irradiates the entire area of the viewing screen and is superimposed on the enlarged projected image, so that the background or field of screen 2 becomes blue while the enlarged projected image of the letters "A" and "B" appears to be cyan. In other words, with either the lamp 9 or the lamp 10 illuminated, the enlarged image of the letters "A" and "B" projected on the viewing screen and the background or field of the viewing screen have different or contrasting hues. By reason of such contrasting hues, the projected image of the letters, indicia or the like can be readily and clearly distinguished from the background or field of the viewing screen. Furthermore, although the image reproducing device 3 provides a reproduced image in only a single color, the image projecting apparatus according to this invention makes it possible, by energizing the lamp 9 and/or the lamp 10, to vary the color of the projected image on the viewing screen 2, and further provides color over the entire background or field of the viewing screen as well as in the image projected thereon so as to enhance the attractiveness of the viewing screen.

It will be apparent that, if the colored light source sources are not provided in accordance with this invention or the lamps 9 and 10 are both deenergized, so that the image projected on the viewing screen 2 is green against a black or dark background or field of the screen, the impingement on the screen of ambient illumination of relatively great intensity will cause the background or field of the viewing screen to become gray while the chroma of the projected green image on the viewing screen is substantially reduced with the result that the contrast between the projected image and the background of the viewing screen deteriorates and distinguishing the projected image becomes difficult. On the other hand, when colored light is superimposed on the projected image on viewing screen 2 in accordance with the present invention, as described above, the projected image is clearly distinguished from the background or field of the viewing screen by the hue difference therebetween, and such hue difference continues to exist for clearly distinguishing the projected image even when ambient light falls on the viewing screen and thereby reduces the brightness contrast between the projected image and the background. Furthermore, since light from the lamp 9 or 10 is added to the light of the image projected on the viewing screen 2 from the image reproducing device 3, the brightness of the viewing screen 2 is increased and, accordingly, the disturbing effects of ambient illumination, such as, due to the reflection by the viewing screen of light from external sources, are reduced.

Although it is possible to obtain a projected image of one color on the viewing screen while the background or field of the viewing screen is a different color by means of a two-color cathode ray tube, that is, without the use of the colored light source or sources characteristic of the present invention, such two-color cathode ray tube has to be provided with a shadow mask for ensuring that the two different color phosphors making up the phosphor screen of the tube will be excited only by the the respective electron beams. As is well known, such a shadow mask limits the energy of the electron beams impinging on the respective color phosphors, and thereby limits the brightness of the image produced on the phosphor screen of the color picture tube. On the other hand in accordance with the present invention, the projected image and background or field of the screen are provided with contrasting colors or hues while using only a single-color cathode ray tube in which no shadow mask is required so that the brightness of the reproduced image, that is, the intensity of the light emitted from the phosphor screen 3a on FIG. 1, is very substantially increased for similarly increasing the brightness of the projected image on viewing screen 2.

In the above described embodiment of the invention, the viewing screen 2 is directly irradiated with the colored light passing through filter 7 and/or filter 8 upon the illumination of the respective light sources 9 and 10. However, in accordance with the present invention, the colored light source or sources may be disposed to irradiate the phosphor screen or panel 3a of the image reproducing device 3 with the respective colored light so that the projecting lens is then effective to project onto the viewing screen both the colored reproduced image and the colored background or field of the phosphor screen. More specifically, as shown on FIG. 5 in which the components or parts of an image projection system corresponding to those described above with reference to FIGS. 1 and 2 are identified by the same reference numerals, an image projecting apparatus according to another embodiment of this invention may be provided with lamps 13 and 14 which are respectively operative to emit red color light and blue color light and which are disposed within cabinet 1 at opposite sides of the green lightemitting phosphor screen 3a of the single-color cathode ray rube 3. Reflectors or light shielding members 15 and 16 are associated with the lamps or colored light sources 13 and 14, respectively, to direct the respective colored light over the entire surface of panel or screen 3a and to prevent the passage through lens 5 of colored light directly from lamps 13 and 14.

It will be apparent that, with the embodiment of the invention shown on FIG. 5, when lamp 13 is illuminated, red light therefrom is projected onto the entire front of outer surface of the panel or phosphor screen 3a so as to be reflected therefrom and projected through lens 5 onto the viewing screen 2 together with the light image produced by the tube 3. Similarly, when lamp 14 is illuminated, blue color light emitted therefrom is projected over the entire front or outer surface of the phosphor screen or panel 3a and reflected therefrom so as to be projected by lens 5 onto viewing screen 2 together with the light image produced by the tube 3. Thus, in the case where phosphor screen 3a is composed of colrr phosphors which emit green light when energized by the electron beam, the illumination of colored light source 13 will cause the projected image on screen 2 to be colored yellow while the background or field of the viewing screen is colored red. On the other hand, the illumination of colored light source 14 will cause the projected image on viewing screen 2 to be colored cyan while the background or field of the viewing screen will be colored blue.

In describing the operation of the embodiments of the invention shown on FIGS. 1 and 2 and on FIG. 5, specific reference has been made above to the alternative illumination of the lamps 9 and 10 and of the lamps 13 and 14, respectively, so that the background or field of the viewing screen 2 will be colored either red or blue. However, if desired, both lamps 9 and 10, or both lamps 13 and 14, can be simultaneously illuminated in which case, if the intensities of illumination from the lamps 9 and 10, or 13 and 14 are suitably adjusted relative to each other, the color of the projected image on the viewing screen 2 and also the color of the background or field of the viewing screen can be varied.

Although the embodiments of the invention described above with reference to FIGS. 1 and 2 and FIG. 5, respectively, employ a single-color cathode ray tube having a phosphor screen emitting green light for reproducing the image in combination with sources of red light and blue color light, it is to be noted that, in accordance with this invention, the image reproducing device may be a two-color cathode ray tube having, for example, red and green light emitting phosphors making up its phosphor screen, while the colored light source provided in accordance with the invention is operative, for example, to emit blue colored light. In this latter case, the image reproduced on the phosphor screen of the two-color cathode ray tube may be red or green or any mixture of such colors, while the blue light is superimposed on such image as projected on the viewing screen to provide the projected image with still another color which contrasts with the blue background or field of the screen. Further, the color cathode ray tube constituting the image reproducing device 3 may be of the three-color type, in which case, still greater variation is possible in the color of the image projected on the viewing screen and the contrast of such color with the hue or color of the background of the viewing screen resulting from the colored light superimposed on the projected image in accordance with this invention. Since two-color or three-color cathode ray tubes have to be provided with shadow masks which reduce the intensity or brightness of illumination of the reproduced images, as described above, the described effects obtainable with such two-color or three-color cathode ray tubes in the image projection apparatus according to this invention can be more advantageously achieved by using, as the image reproducing device, a plurality of single-color cathode ray tubes having phosphor screens which respectively emit different colors. When using a plurality of single-color cathode ray tubes, identical images, but in different colors, are reproduced on the phosphor screens of the plurality of tubes, and the differently colored images are projected on the viewing screen in registration with each other through a common projection lens, for example, by means of a dichroic or semireflecting mirror. It will also be apparent that image reproducing devices other than the specifically described cathode ray tubes, such as for example, eidophors, can be employed in the image projecting apparatus according to this invention.

In each of the embodiments illustrated on FIGS. 1 and 2 and on FIG. 5, respectively, the viewing screen 2 has been shown to be of the reflecting type, that is, is intended to be viewed from the side thereof onto which the reproduced image is projected. However, it will be apparent that the image projecting apparatus according to this invention can be used with a viewing screen of the back-projection type, that is, one in which the screen is viewed from the side thereof opposed to that against which the reproduced image is projected. Advantageously, the viewing screen employed with the image projecting apparatus according to this invention may be of a so-called directional type so that light from overhead sources of illumination will not be projected to the viewer's eyes either by reflection from, or transmission through the viewing screen.

Although illustrative embodiments of this invention and various modifications thereof have been described in detail herein, it is to be understood that the invention is not limited to those precise embodiments or modifications, and that various changes and further modifications may be effected therein by one skilled in the art without departing from the scope or spirit of the invention as defined in the appended claims.

What is claimed is:

1. An apparatus for projecting images on a viewing screen comprising image reproducing means having an image display panel and being operative to produce on said display panel an image of at least one color, projection lens means for projecting said image from said display panel onto the viewing screen, and colored light source means for superimposing on the image projected onto said viewing screen colored light of a hue different from each said color of the image produced by said image reproducing means.

2. An apparatus according to claim 1; in which said colored light source means is disposed to directly irradiate the full area of the viewing screen with said colored light.

3. An apparatus according to claim 2; in which said colored light source means includes two light sources disposed at opposite sides of said projection lens means and being selectively operative to irradiate the viewing screen with light of different colors, respectively; and in which each of said different colors of light is of a hue different from each said color of the image projeced by the image reproducing means.

4. An apparatus according to claim 1; in which said colored light source means is disposed to irradiate the full area of said display panel with said colored light.

* * * * *